US008185220B2

(12) United States Patent
Lloyd

(10) Patent No.: US 8,185,220 B2
(45) Date of Patent: May 22, 2012

(54) HMI DEVICES WITH INTEGRATED USER-DEFINED BEHAVIOR

(75) Inventor: Robert F. Lloyd, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/821,478

(22) Filed: Jun. 23, 2010

(65) Prior Publication Data

US 2010/0256785 A1    Oct. 7, 2010

Related U.S. Application Data

(63) Continuation of application No. 11/468,028, filed on Aug. 29, 2006, now abandoned.

(51) Int. Cl.
*G05B 15/00* (2006.01)
(52) U.S. Cl. .............................. 700/83; 700/18; 715/762
(58) Field of Classification Search .................... 700/83, 700/17, 18; 715/762, 763
See application file for complete search history.

(56) References Cited

U.S. PATENT DOCUMENTS

| | | | |
|---|---|---|---|
| 6,640,169 B2 | 10/2003 | Bergmann et al. | |
| 6,819,960 B1 * | 11/2004 | McKelvey et al. | 700/17 |
| 6,834,209 B2 | 12/2004 | Potz et al. | |
| 6,839,600 B2 | 1/2005 | Spenser et al. | |
| 2003/0076355 A1 * | 4/2003 | Kodosky | 345/763 |
| 2003/0135116 A1 | 7/2003 | Ogasawara et al. | |
| 2005/0149881 A1 | 7/2005 | Proulx et al. | |
| 2005/0155043 A1 | 7/2005 | Schulz et al. | |
| 2006/0095855 A1 | 5/2006 | Britt et al. | |
| 2006/0129336 A1 | 6/2006 | Pretlove et al. | |
| 2006/0149431 A1 | 7/2006 | Wilson et al. | |
| 2006/0171675 A1 | 8/2006 | Kolletzki | |

OTHER PUBLICATIONS

Non-Final Office Action dated Sep. 22, 2008 for U.S. Appl. No. 11/468,028, 7 pages.
Final Office Action dated Mar. 4, 2009 for U.S. Appl. No. 11/468,028, 6 pages
Non-Final Office Action dated Jun. 26, 2009 for U.S. Appl. No. 11/468,028, 6 pages.
Final Office Action dated Mar. 30, 2010 for U.S. Appl. No. 11/468,028, 6 pages.

* cited by examiner

*Primary Examiner* — Albert Decady
*Assistant Examiner* — Steven Garland
(74) *Attorney, Agent, or Firm* — Turocy & Watson, LLP; Alex Kuszewski; John M. Miller

(57) ABSTRACT

The claimed subject matter provides a system and/or method that facilitates utilizing a human machine interface (HMI). An interface component can facilitate receipt of data. A human machine interface (HMI) component communicatively coupled to the interface component can include a device with a pre-programmed primitive; the device employs a user-defined functionality via the received data.

20 Claims, 16 Drawing Sheets

HMI DEVICES WITH INTEGRATED USER-DEFINED BEHAVIOR

CROSS REFERENCE TO RELATED APPLICATIONS

This application is a Continuation of U.S. patent application Ser. No. 11/468,028, filed on Aug. 29, 2006, entitled "HMI DEVICES WITH INTEGRATED USER-DEFINED BEHAVIOR", the entirety of which is incorporated herein by reference.

TECHNICAL FIELD

The subject invention relates to industrial control systems and, more particularly, to employing human machine interfaces (HMIs) with user-defined behavior.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

To quickly and easily effectuate control of a system or process within industrial automation environments, equipment manufacturers typically create specialized human-machine interfaces (HMIs) that are employed by operators to deliver commands to industrial systems/processes and/or receive data from industrial systems/processes. In other words, HMIs provide an essential communication link between operators and automation devices, wherein such HMIs enable operators to, among other things, implement and control devices and receive feedback by monitoring device status and health during operation. Without these interfaces, high-level industrial automation would be difficult if not impossible to achieve.

Over time, HMIs have undergone several and drastic changes. For instance, a push-button that commissions and de-commissions a machine is a simplest form of a HMI, and these interfaces have been existent for several years. Terminals were later designed that displayed text messages to end users, wherein such messages are indicative of a process performed by a server or processor associated with an automation device. For example, a failed device can generate an internal error code representing a determined error which can then be matched with a particular error message. This message can thereafter be displayed to an operator on a display device. Development of client-side processing has enabled graphical depictions of status and control commands to operators, which has shifted a burden from an automated device or associated processor to a client-side graphical user interface. These graphical user interfaces improve an ability of users to access information quickly and easily. Conventional HMIs are programmed in a broad-sweeping manner such that various functionalities are employed; yet more so than not, these broad-sweeping functionalities must be manipulated by clients, customers, users, programmers, and the like in order to provide the desired functionality and/or behavior. However, such customization and/or personalization of HMIs is extremely costly, problematic, and inefficient.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate integrating user-defined functionality in a device within a human machine interface (HMI). A human machine interface (HMI) component can include a device that has a pre-programmed primitive (e.g., out-of-box core functionality that is generic to the specific device) that can be appended with user-defined functionality based at least in part upon specific needs and/or desires associated with at least one of an application, an automated industrial environment, a control system, and the like. The device can be, for instance, a light emitting diode (LED), a dial, an analog control, a bar graph, a graph, a push button, a gauge, a visual indicator, a slider, a light indicator, a numeric read out, a text read out, any suitable character read out, a numeric input, a text input, a graphical icon, any suitable device associated with an HMI that can provide user interaction, and any suitable device associated with an HMI that can provide data.

Data can be received via an interface to allow for the programming of the device with the substantially similar programming paradigms associated with applications, control systems, and/or automated industrial environments and within the substantially similar programming space within the HMI component. In other words, the user-defined functionality and customization can be encapsulated and isolated within the HMI component. Thus, errors, changes, manipulations, corrections can be maintained in one location rather than throughout code associated with the device and any place the device is utilized. The data can further relate to a user input. The user input can be, but is not limited to, a mouse input (e.g., with a click, double click, location on a display, etc.), a keyboard, a stylus input, a touch-screen input, a voice command, a trackball, a coordinate associated with a screen, any suitable input via a machine to interact with an HMI, etc.

In accordance with an aspect of the claimed subject matter, the HMI component can include a compound device which can be two or more devices with user-defined functionality. For example, a slider device and an LED device can be utilized in an HMI, where both the slider and the LED can be programmed in a custom manner to provide unique and particular behavior in connection with a specific environment, application, industrial environment, and the like.

In accordance with another aspect of the innovation described herein, the HMI component can utilize a remote service to implement at least a portion of custom functionality associated with the device integrated therewith. The device within the HMI component can be programmed via the interface to provide post-manufacturing defined behavior and/or functionality over, for instance, a machine boundary. The custom functionality can be provided by a third-party, a remote service, a subscription, a second-party, a manufacture, a web-site, a community of users, an online-forum, and the like. In other aspects of the claimed subject matter, methods are provided that facilitate integrating user-defined functionality in a device within a human machine interface (HMI).

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
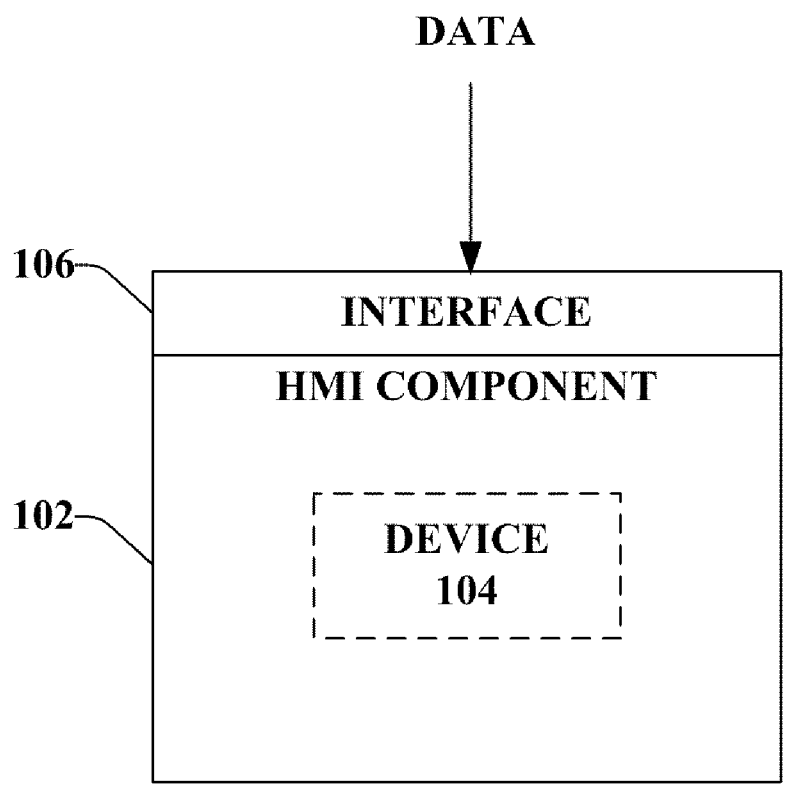
FIG. 1 illustrates a block diagram of an exemplary system that facilitates integrating user-defined functionality in a device within a human machine interface (HMI).

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates integrating user-defined functionality in a device within a human machine interface (HMI). The system 100 includes a human machine interface (HMI) component 102 with a device 104 that is incorporated therewith that can provide user-specified functionality based on data received via an interface component 106 (also referred to as the interface 106 and discussed infra). For instance, the device 104 within the HMI component 102 can be, but is not limited to, a light emitting diode (LED), a dial, an analog control, a bar graph, a graph, a push button, a gauge, a visual indicator, a slider, a light indicator, a numeric read out, a read out, a numeric input, an input, a graphical icon, any suitable device associated with an HMI that can provide user interaction, and any suitable device associated with an HMI that can provide data. The device can include pre-programmed primitives, wherein a user can further defined the functionality and/or behavior of such device 104 with custom programming of, for instance, control logic (e.g., Logix, ladder logic, etc.). Moreover, there can be a corresponding set of control primitives (e.g., coils, contacts, timers, counters, adders, etc.).

It is to be appreciated that the logic is not just an extension to the primitive but allows the behavior to be defined in terms of interactions between primitives. The primitives can have very simple and limited customization (e.g., based on being primitives). The custom HMI device can be produced by the user combining HMI and logic primitives together to produce custom behavior and complex interfaces. Thus, the claimed subject matter includes adding custom behavior to a primitive and/or defining custom behavior between at least two primitives in order to create a custom HMI device.

It is to be appreciated that the user-defined functionality can be programmed within the programming space within the device 104 (and hence within the HMI component 102). By appending the already programmed primitive functionality (e.g., out-of-box core functionality that is generic to the specific device) with user-defined customization, the devices can seamlessly integrate with any suitable application, automated industrial control environment, component, device, physical device, etc. Moreover, the internal logic (e.g., customized behavior) of the device 104 can be hidden from the designer (e.g., encapsulated within the HMI component 102 programming space). Conventionally, HMI devices would include a multitude of pre-defined devices with very specific behavior and in order to provide custom behavior, the user would painstakingly develop external logic (e.g., within a logic controller) to implement such behavior, wherein such deficiencies are aforementioned (e.g., tedious process, inefficient, costly, replication, programming issues, massive amounts of tag data, communication overhead, etc.).

For instance, a push button can be a device within an HMI, wherein the push button can include fundamental functionality and/or primitives (e.g., out-of-box generic behavior). Thus, the push button can include generic functionality such as allowing on-off behavior. An entity (e.g., designer, user, third-party, consumer, end-user, middle-man, programmer, machine, etc.) can provide custom functionality via an interface to provide application-specific and/or automated industrial environment specific behavior. The entity can program custom, post-manufactured functionality such as, but not limited to, a delay (e.g., hold the button down for n seconds before starting/stopping, n is a positive integer), a double-push, light-up functionality, etc.

The interface 106 can receive data related to the HMI component 102 and/or the device 104 such that received data can facilitate defining the behavior of the device 104. For example, the data received can relate to the programming of the HMI component 102, the device 104, and/or any combination thereof. For instance, the interface can be a computer, wherein a user can program the device 104 in accordance with user-specific (e.g., custom in relation to applications and/or automated industrial environments) functionality. It is to be appreciated that the programming of the device 104 and/or the HMI component 102 can be substantially similar to the programming associated with an industrial environment, an application, and/or any suitable control system. Moreover, the programming of the device 104 and/or the HMI component 102 can be encapsulated inside the machine space and/or programming space within the device 104 and within the HMI component 102. The programming of the device 104 can be encapsulated and isolated from any other data related to the system 100 such that any errors, changes, manipulations, corrections can be maintained in one location rather than throughout code associated with the device and any place the device is utilized. It is to be further appreciated that the received data can relate to a user input. The user input can be, but is not limited to, a mouse input (e.g., with a click, double click, location on a display, etc.), a keyboard, a stylus input, a touch-screen input, a voice command, a trackball, a coordinate associated with a screen, any suitable input via a machine to interact with an HMI, etc.

Moreover, the system 100 can include any suitable and/or necessary interface component 106 (referred to herein as interface 106), which provides various adapters, connectors, channels, communication paths, etc. to integrate the HMI component 102 into virtually any operating and/or database system(s). In addition, the interface component 106 can provide various adapters, connectors, channels, communication paths, etc., that provide for interaction with the HMI component 102.

Figure 2:
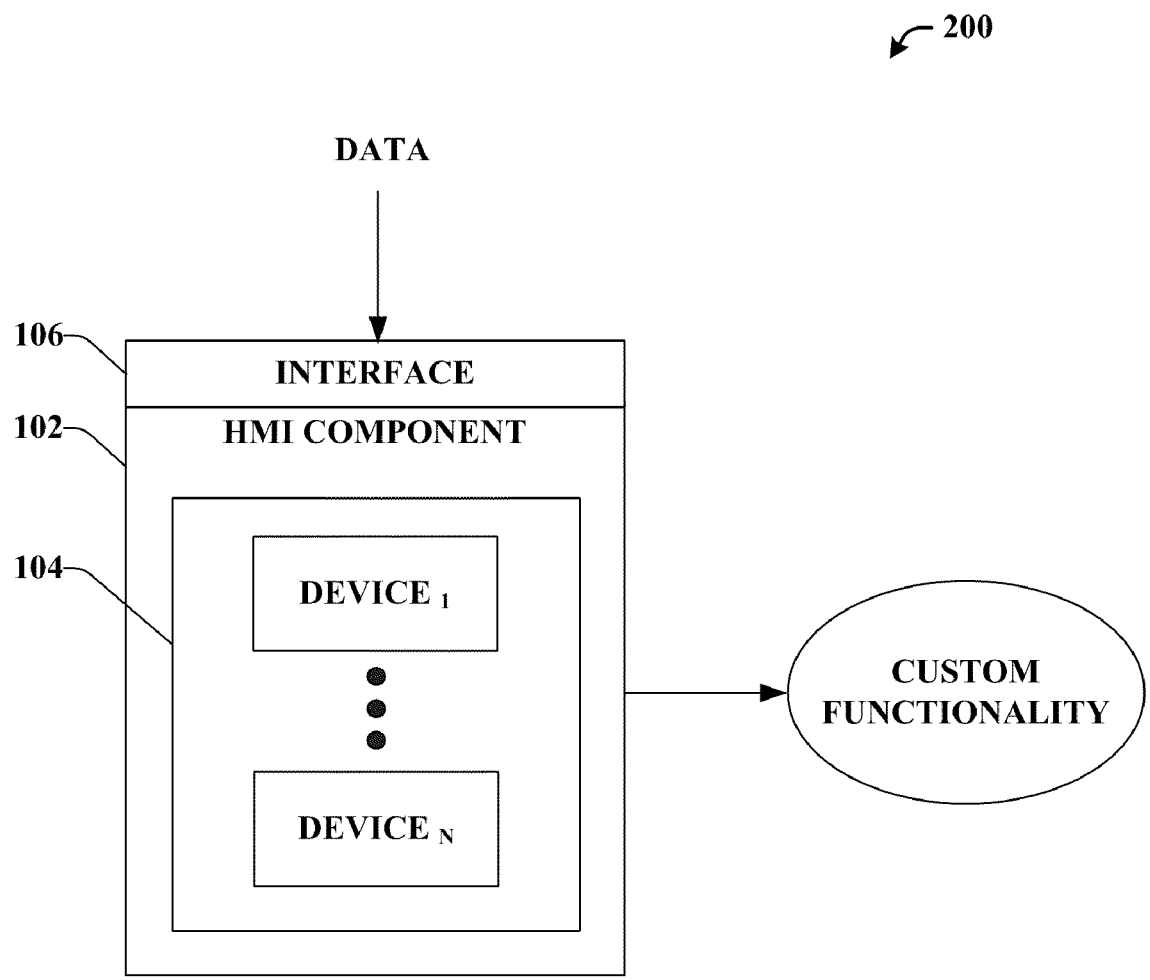
FIG. 2 illustrates a block diagram of an exemplary system that facilitates providing custom functionality for at least one device associated with a human machine interface (HMI).

FIG. 2 illustrates a system 200 that facilitates providing custom functionality for at least one device associated with a human machine interface (HMI). The HMI component 102 can provide custom functionality associated with at least one device 104 such that the custom functionality is in addition to an out-of-box primitive behavior and can be user-defined. Thus, an HMI with a bar graph that has known primitives can be purchased by a user. By utilizing the programming paradigm associated with a respective control system, automated industrial environment, application, and/or any combination thereof, the user can provide custom behavior specifically tailored to a particular need. It is to be appreciated that there can be any suitable number of devices 104, such as device$_1$ to device$_N$, where N is a positive integer.

For instance, the HMI component 102 can include a compound device which can be two or more devices with user-defined functionality. For example, a push button and an LED can be utilized in an HMI, where both the push button and the LED can be programmed in a custom manner to provide unique and particular behavior in connection with a specific environment, application, industrial environment, and the like. In particular, the LED can be programmed to flash during a delayed interval before the push button activates and/or stops.

The HMI component 102 can provide control to, for example, a physical device (not shown) within an industrial automation environment. The physical device can be, but is not limited to, a computer, a disparate controller, a roller, a station, a welder, a scanner, a belt conveyor, a pump, a press, a fan, a furnace, a cooler, a valve, an electrical component, a drain, a photo eye, etc., or any other suitable device utilized in automation systems. In addition, it is to be understood that the HMI component 102 can provide control for a plurality of physical devices within an automated industrial environment and the claimed subject matter is not so limited. It is to be appreciated that there can be a class of HMI devices that can provide display and feedback of process status without providing any direct control functionality. Moreover, there can also be custom devices that utilize HMI and logic primitives. Thus, the above class is to be considered within the realm of the subject innovation.

Figure 3:
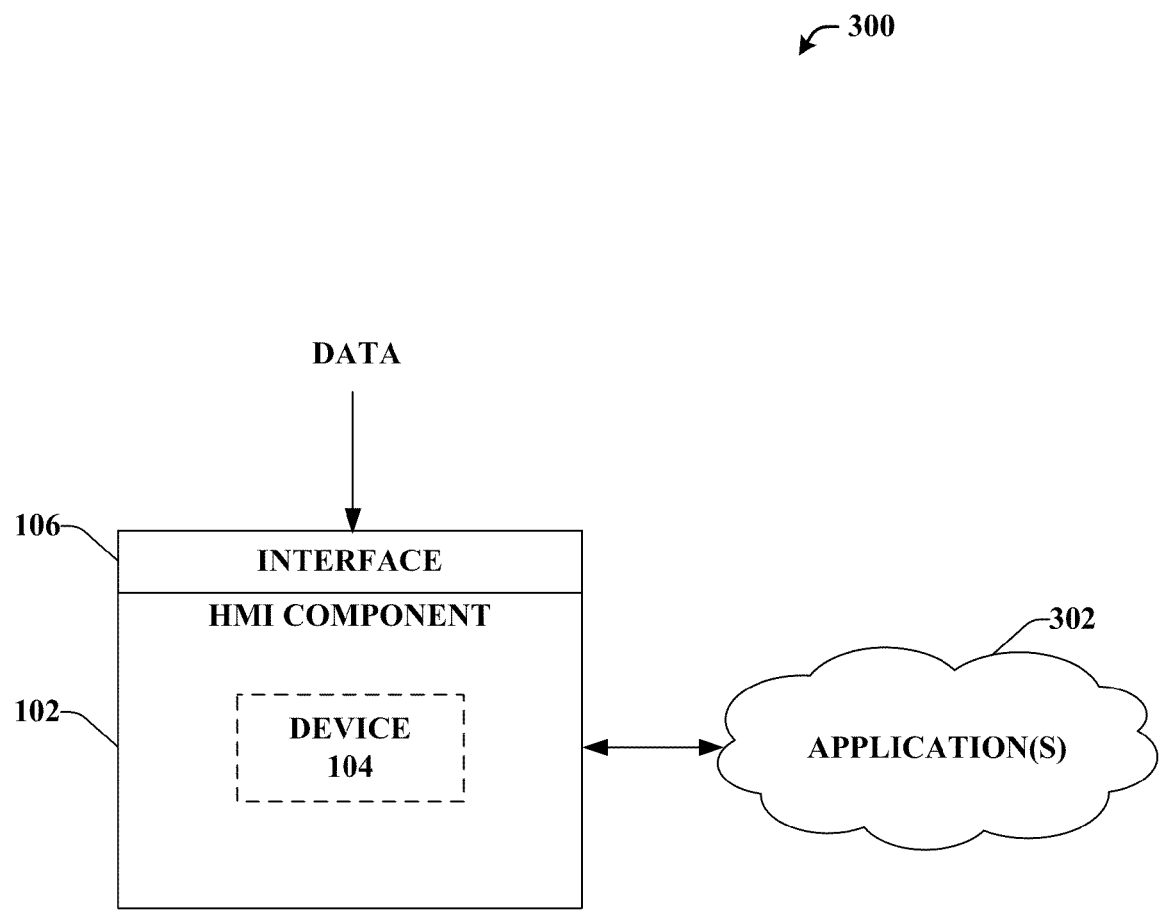
FIG. 3 illustrates a block diagram of an exemplary system that facilitates programming a device with known primitives within a human machine interface (HMI) with a substantially similar programming paradigm as an application associated therewith.

FIG. 3 illustrates a system 300 that facilitates programming a device with known primitives within a human machine interface (HMI) with a substantially similar programming paradigm as an application associated therewith. The HMI component 102 can include the device 104 with primitive functionality that can be appended with user-defined customization in order to meet a special desire and/or need. A user can provide programming data via the interface 106 to program the device in accordance with the substantially similar programming paradigm associated with the HMI component 102, an industrial automation environment, and/or an application 302. It is to be appreciated that the application(s) 302 can be any suitable application associated with control devices, physical devices within an industrial control environment, an automated industrial environment, a control system, and the like. Moreover, the programming of the device 104 can be encapsulated and isolated from any other data related to the system 300 such that any errors, changes, manipulations, corrections can be maintained in one location rather than throughout code associated with the device and any place the device is utilized.

Figure 4:
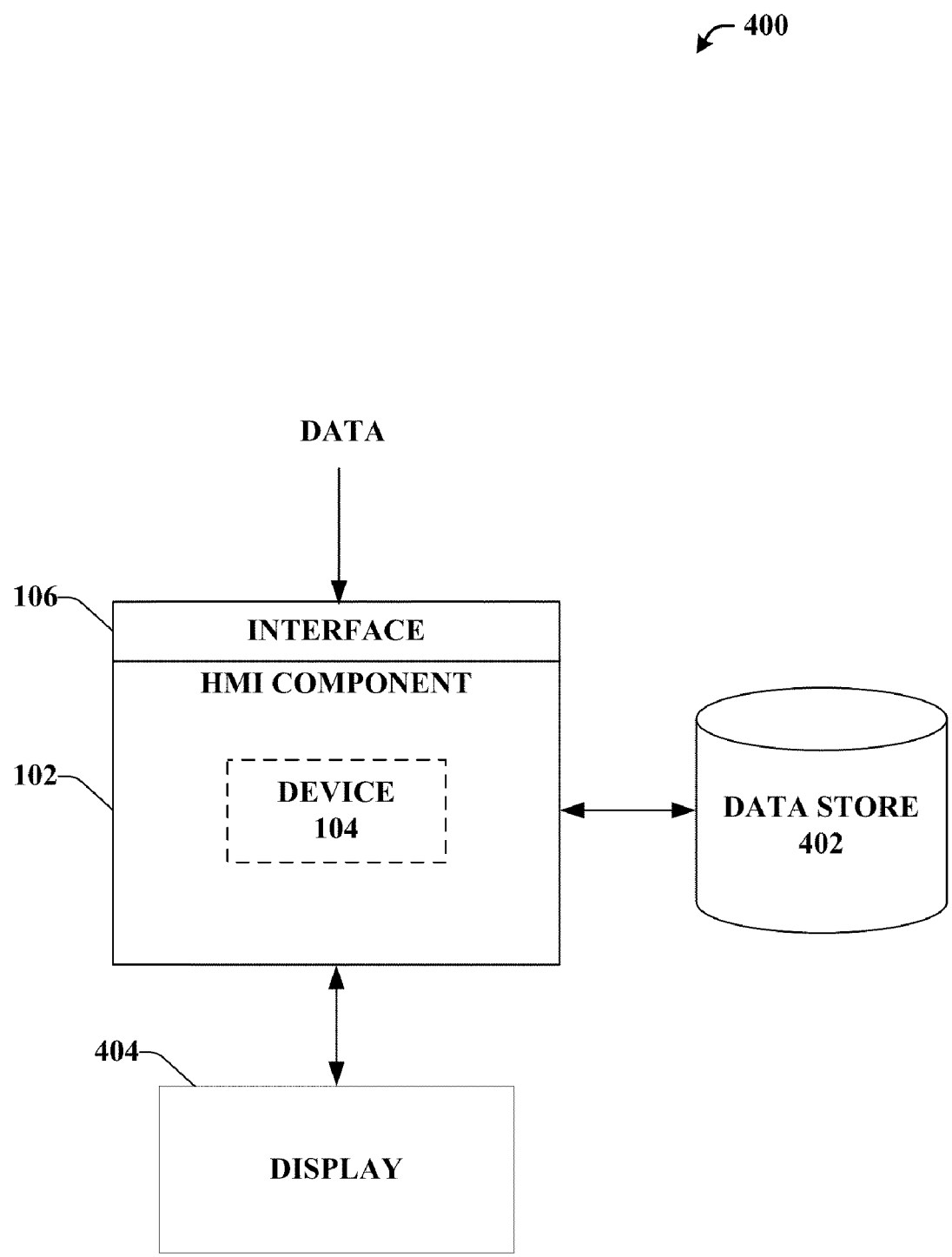
FIG. 4 illustrates a block diagram of an exemplary system that facilitates encapsulating custom-programmed functionality within a human machine interface programming space.

FIG. 4 illustrates a system 400 that facilitates encapsulating custom-programmed functionality within a human machine interface programming space. The HMI component 102 can utilize a display 404 and the device 104 to employ user-defined behavior custom to a particular user environment, application, and/or automated industrial environment. For example, an entity (e.g., designer, user, third-party, consumer, end-user, middle-man, programmer, machine, etc.) can provide user-defined functionality utilizing the interface 106 to allow customizable devices within the HMI component 102 specific to particular needs.

Moreover, the system 400 can include a data store 402 that can store devices, HMIs, graphics associated with devices, graphics associated with HMIs, pre-defined functionality, pre-defined device behavior, user-defined device behavior, a portion of user-defined device functionality, programming data, a portion of programming data, user settings, user profiles, device primitive data, etc. The data store 402 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 402 of the subject systems and methods is intended to comprise, without being limited to, these and any other suitable types of memory. In addition, it is to be appreciated that the data store 402 can be a server, a database, a hard drive, and the like.

Figure 5:
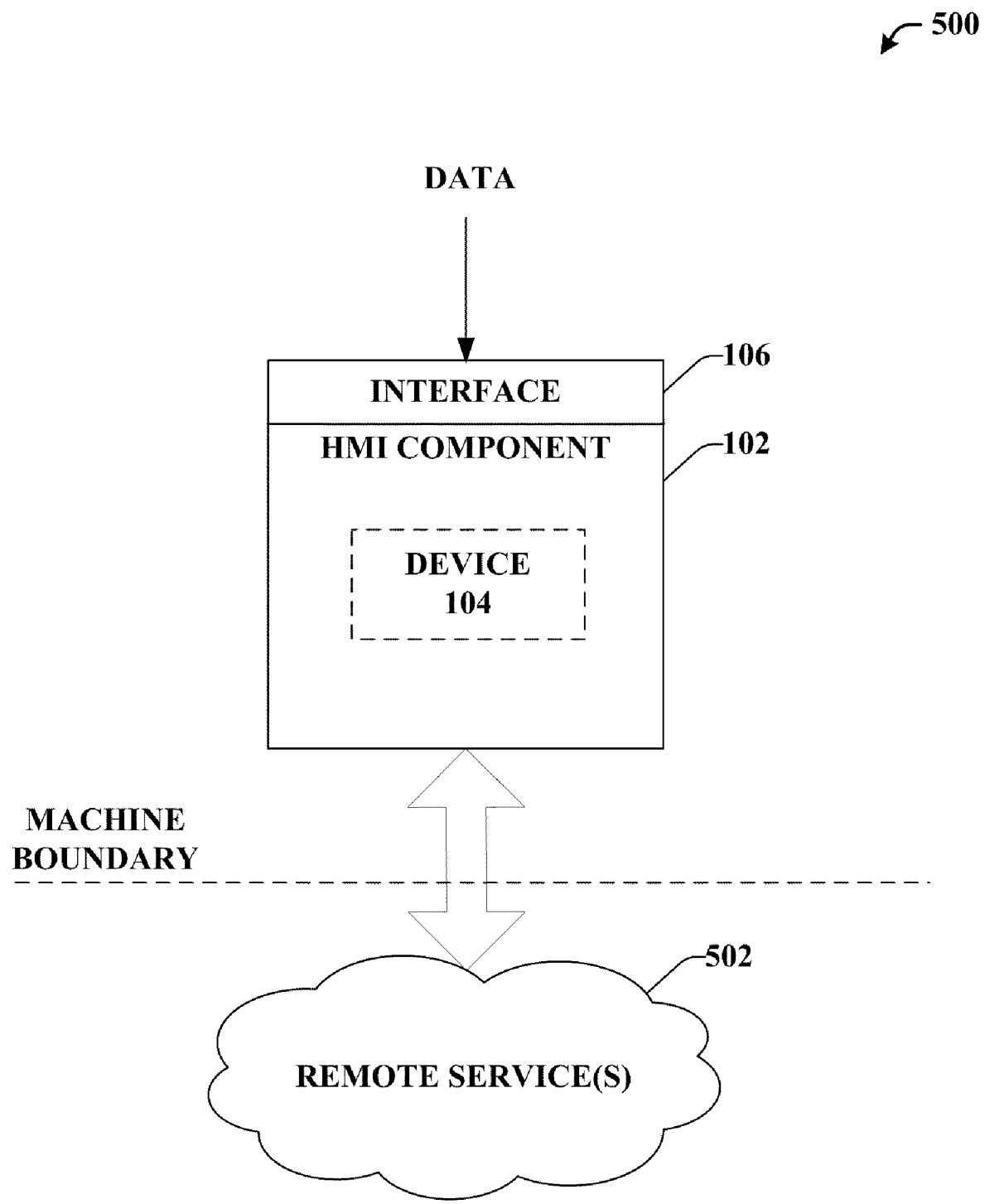
FIG. 5 illustrates a block diagram of an exemplary system that facilitates utilizing a remote service to provide at least a portion of customized functionality for a device associated with a human machine interface.

FIG. 5 illustrates a system 500 that facilitates utilizing a remote service to provide at least a portion of customized functionality for a device associated with a human machine interface. The device 104 within the HMI component 102 can be programmed via the interface 106 to provide post-manufacturing defined behavior and/or functionality. For instance, a user can purchase an HMI component 102 including at least one device 104 with known primitive functionality (e.g., core, simple, generic functionality) associated with the particular device. As stated above, the device 104 can be, but is not limited to, a light emitting diode (LED), a dial, an analog control, a bar graph, a graph, a push button, a gauge, a visual indicator, a slider, a light indicator, a numeric read out, a read out, a numeric input, an input, a graphical icon, any suitable device associated with an HMI that can provide user interaction, and any suitable device associated with an HMI that can provide data.

A remote service 502 can provide various portions of data associated with customized programming of the device 104 within the HMI component 102. For example, a third-party service can allow subscription (e.g., paid, free, etc.) to services that can provide a community of users that can share customized functionality associated with devices that have been implemented in user's respective environments. In another example, the party can be a manufacture of the HMI component 102 with the incorporated device 104 since such manufacture has knowledge of the various consumers of such devices who potentially created/generated user-defined functionality. Thus, the manufacture can provide the remote service 502 over a machine boundary that allows the upload and/or browsing of various customized functionalities associated with devices within HMIs. In still another example, a request can be made from a user to the remote service 502 with specific details on a desired custom functionality for a particular device, wherein the remote service 502 can fulfill such request by providing the user-defined customization of the behavior for the device 104. It is to be appreciated that any remote service 502 can be utilized in connection with providing customized functionality of the device 104, primitive functionality of the device 104, and/or any other suitable data and/or assistance related to the system 500.

Figure 6:
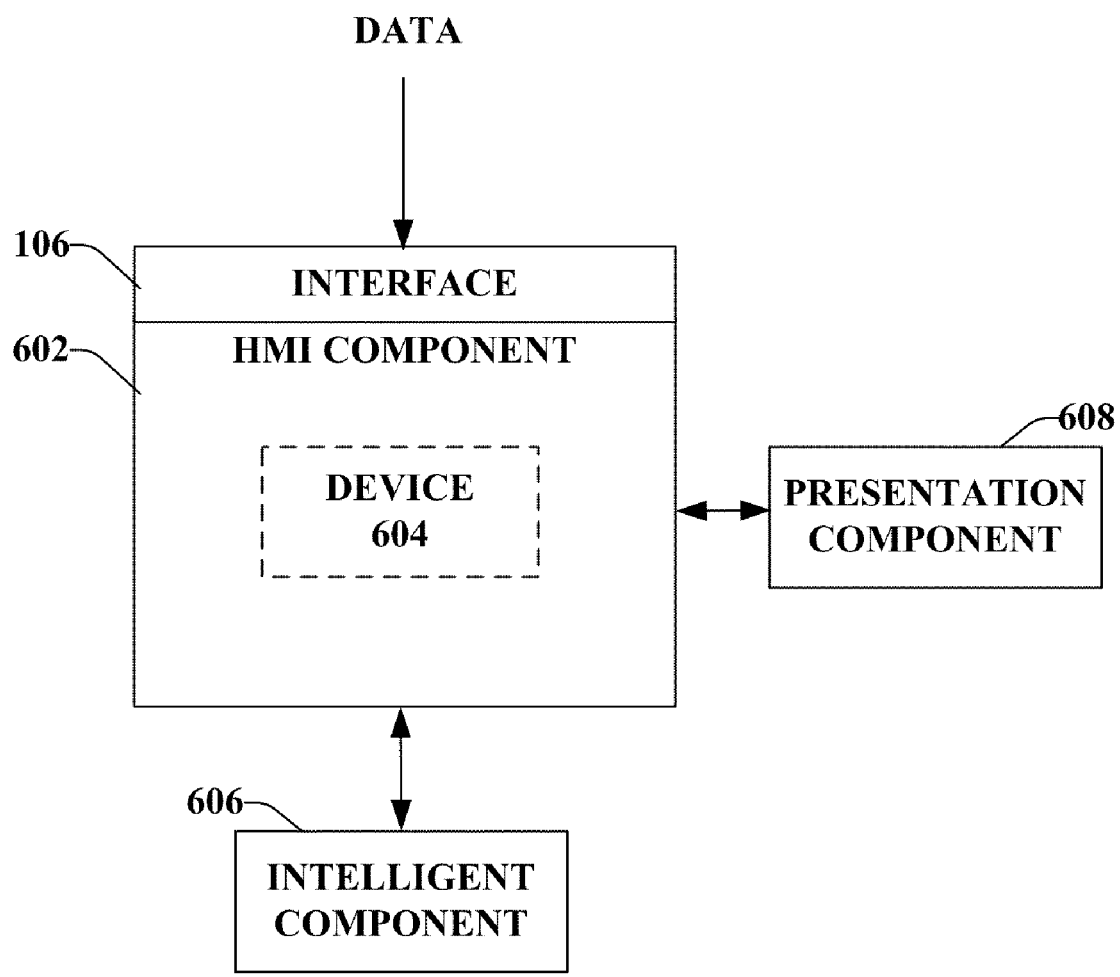
FIG. 6 illustrates a block diagram of an exemplary system that facilitates integrating user-defined functionality in a device within a human machine interface (HMI).

FIG. 6 illustrates a system 600 that employs intelligence to facilitate integrating user-defined functionality in a device within a human machine interface (HMI). The system 600 can include a human machine interface (HMI) component 602, a device 604, and an interface 106 that can all be substantially similar to respective components, devices, and interfaces described in previous figures. The system 600 further includes an intelligent component 606. The intelligent component 606 can be utilized by the HMI component 602 to facilitate providing user-defined behavior for the device 604 encapsulated (e.g., hardware and/or software) within the HMI component 602. For example, the intelligent component 606 can infer optimal functionality for the device 604, control logic associated with the device 604, device compatibility for compound devices within the HMI component 602, user preferences, aesthetics, application and device compatibility, application implementation, device implementation, user-definitions, user profiles, default settings, etc. In one example, the intelligent component 606 can be encapsulated within the custom HMI device.

Moreover, the intelligent component 606 can facilitate utilizing a consumption of a material and the status of such material to an operator role and/or position. For example, the intelligent component 606 can infer the consumption of raw materials utilized in the production of a particular industrial automation process and/or system. Such inference can be based at least in part upon historic data related to the consumption of materials, status and/or supply of materials, etc. Moreover, such consumption and status of materials can be communicated to an operator and/or the role of an operator.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 608 can provide various types of user interfaces to facilitate interaction between a user and any component coupled to the HMI component 602. As depicted, the presentation component 608 is a separate entity that can be utilized with the HMI component 602. However, it is to be appreciated that the presentation component 608 and/or similar view components can be incorporated into the HMI component 602 and/or a stand-alone unit. The presentation component 608 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the HMI component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
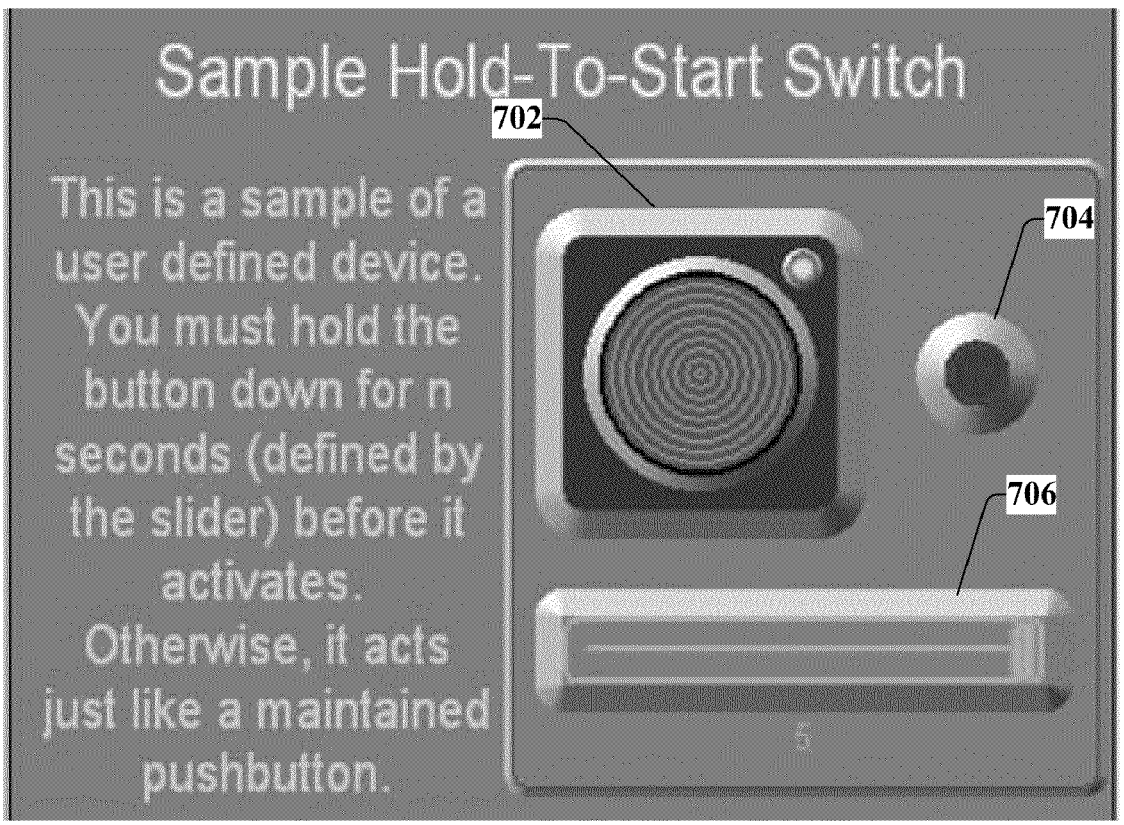
FIG. 7 illustrates an exemplary human machine interface (HMI) with device(s) having customized functionality.
Figure 8:
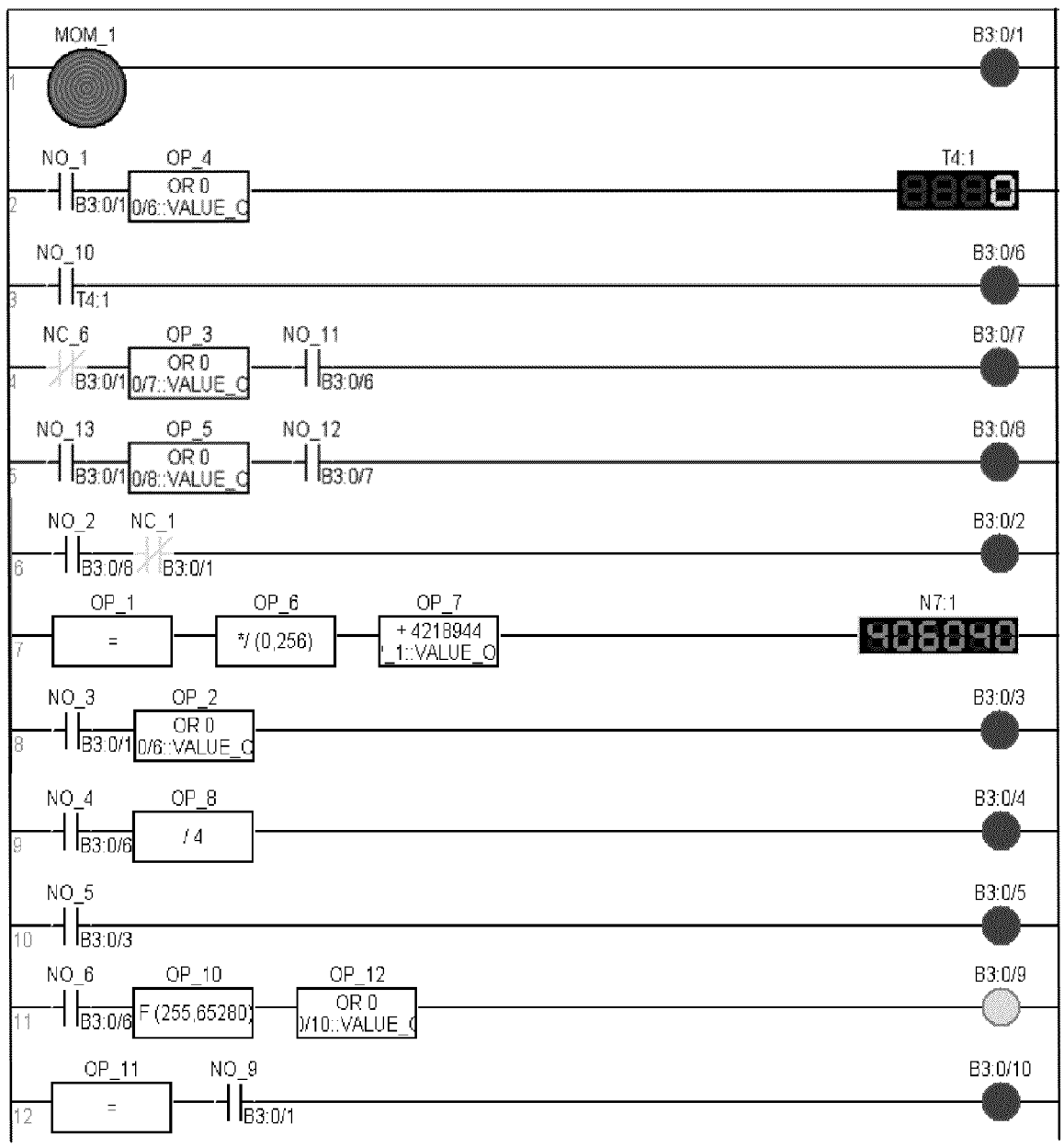
FIG. 8 illustrates an exemplary portion of control logic associated with at least one device incorporated within a human machine interface (HMI).

FIG. 7 illustrates an exemplary human machine interface (HMI) 700 with device(s) having customized functionality. The HMI 700 can include compound devices such as a push button device 702, an LED device 704, and a slider device 706. In particular, the HMI 700 can have user-specified behavior based on user preferences and/or application needs. In this example, the push button device can be a delay such that an input on the push button device 702 must be initiated for a defined amount of time, wherein the defined amount of time is ascertained by the slider device 706. Once the push button device is activated, the LED device 704 can be activated. The HMI 700 is an example having compound devices that can have customized functionality while seamlessly interacting with one another, the HMI, an application, a physical device, and/or an automated industrial environment. Turning briefly to FIG. 8, an exemplary portion of control logic 800 associated with the HMI 700 is illustrated.

In one example, after a user creates a custom control from a primitive and glue logic, the custom control can become completely encapsulated and is indistinguishable from any other HMI primitive. This new and custom control can be added to and configured within any user application as if it were provided atomically by the HMI manufacturer or maker. This can include utilizing the custom control with an application, or using it as a primitive within another custom control. In addition, part of this customization can also involve the ability of the end-user to define which aspects of the custom control are available for configuration by the end-user, and which properties are fixed and hidden from the end-user.

Figure 9:
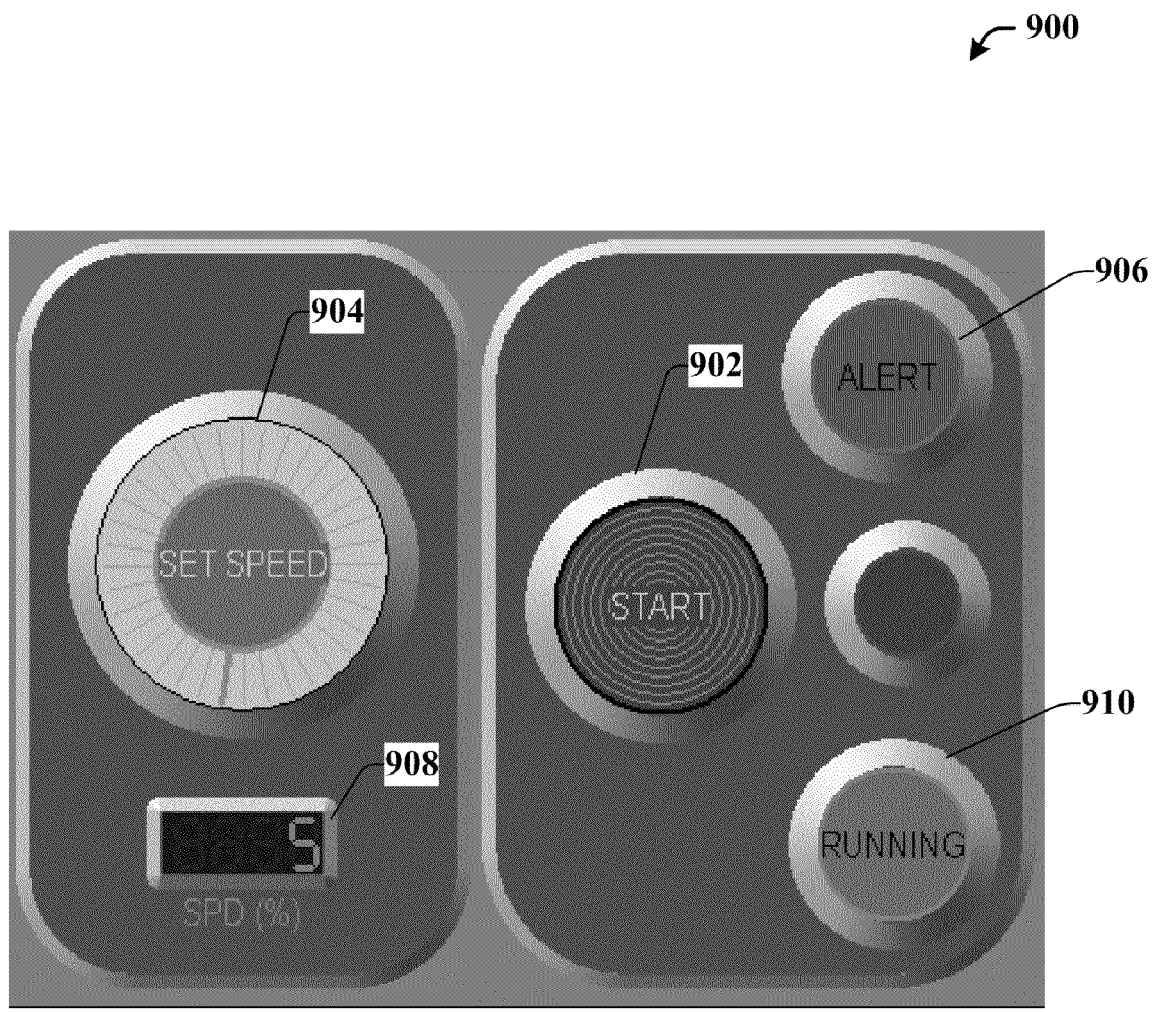
FIG. 9 illustrates an exemplary human machine interface (HMI) with device(s) having user-defined functionality in addition to out-of-box functionality.
Figure 10:
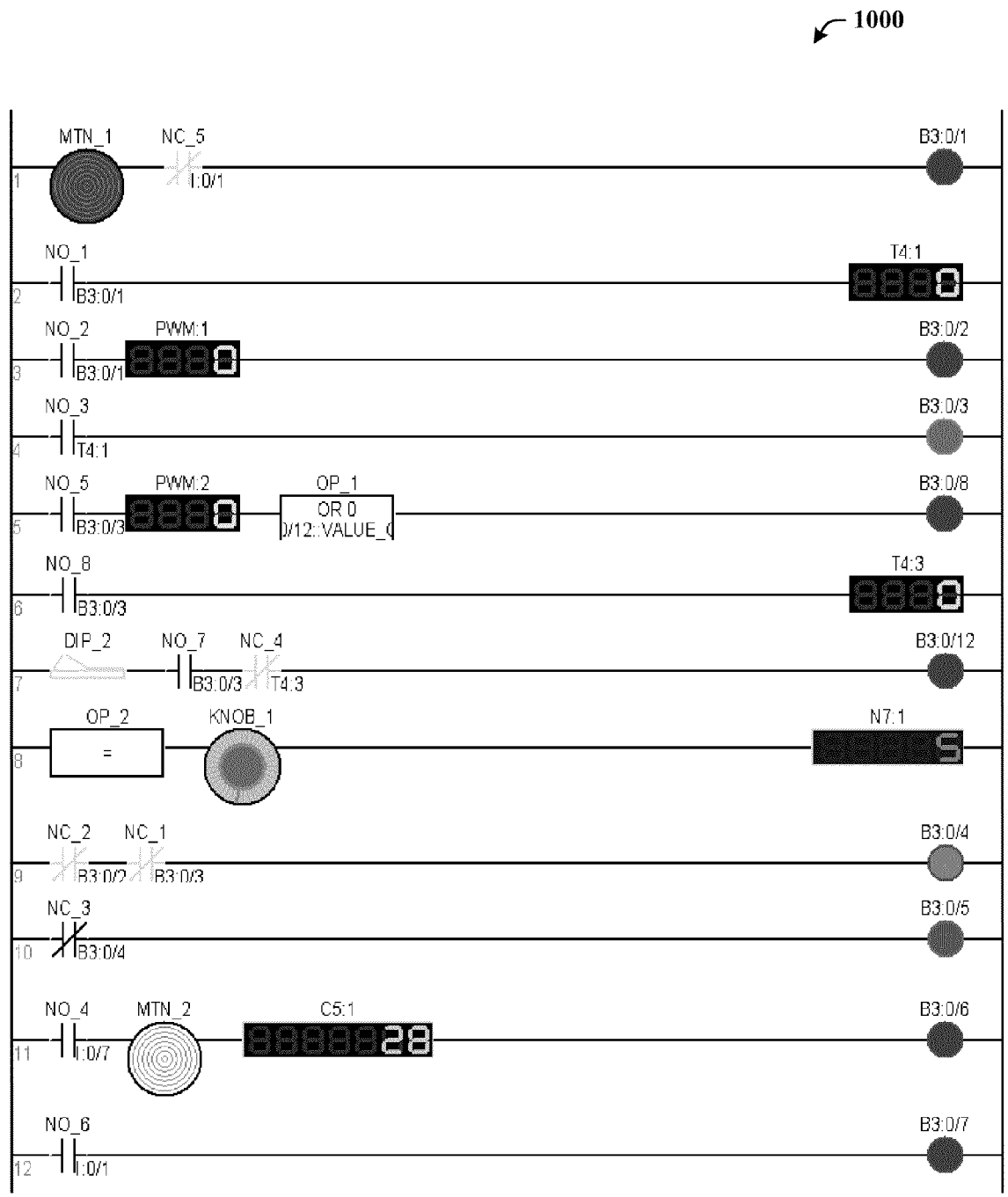
FIG. 10 illustrates an exemplary portion of control logic associated with at least one device incorporated within a human machine interface (HMI).

FIG. 9 illustrates an exemplary human machine interface (HMI) 900 with device(s) having user-defined functionality in addition to out-of-box functionality. The HMI 900 can include compound devices such as a start button device 902, a set speed dial device 904, an alert LED device 906, a numeric output device 908, and a running LED device 910. In this example, the HMI 900 is customized to operate a luggage return belt such that each device is specifically programmed for such specified operation. In particular, the start button device 902 can be depressed to activate the luggage return belt at a speed ascertained by the set speed dial device 904 (e.g., indicated by the numeric output device 908), while an alert LED device 906 can be activated for a set amount of time. Upon the set amount of time expiring, the running LED device 910 can be activated. It is to be appreciated that the above is solely an example, and various nuances can be implemented based on the user-defined functionality and customization described supra. Referring to FIG. 10, an exemplary portion of control logic 1000 associated with at least one device incorporated within a human machine interface (HMI) is illustrated.

Figure 11:
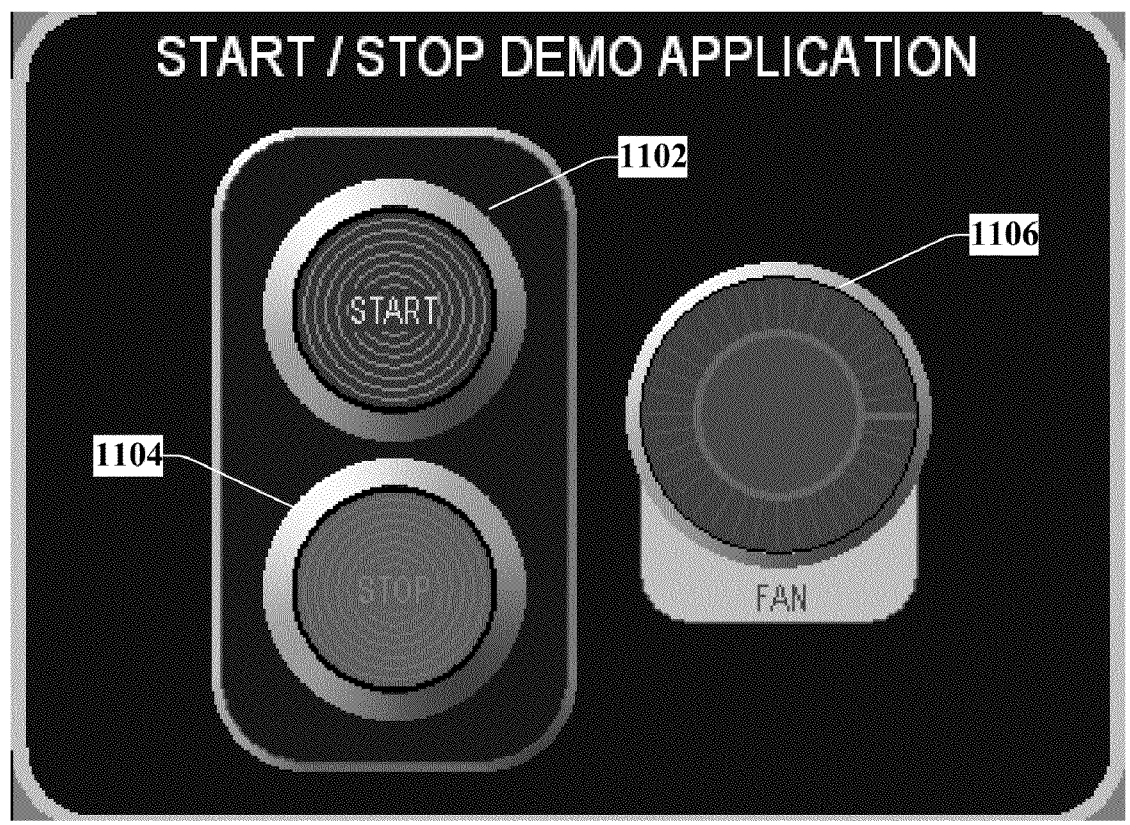
FIG. 11 illustrates an exemplary human machine interface (HMI) with device(s) having customized functionality.
Figure 12:
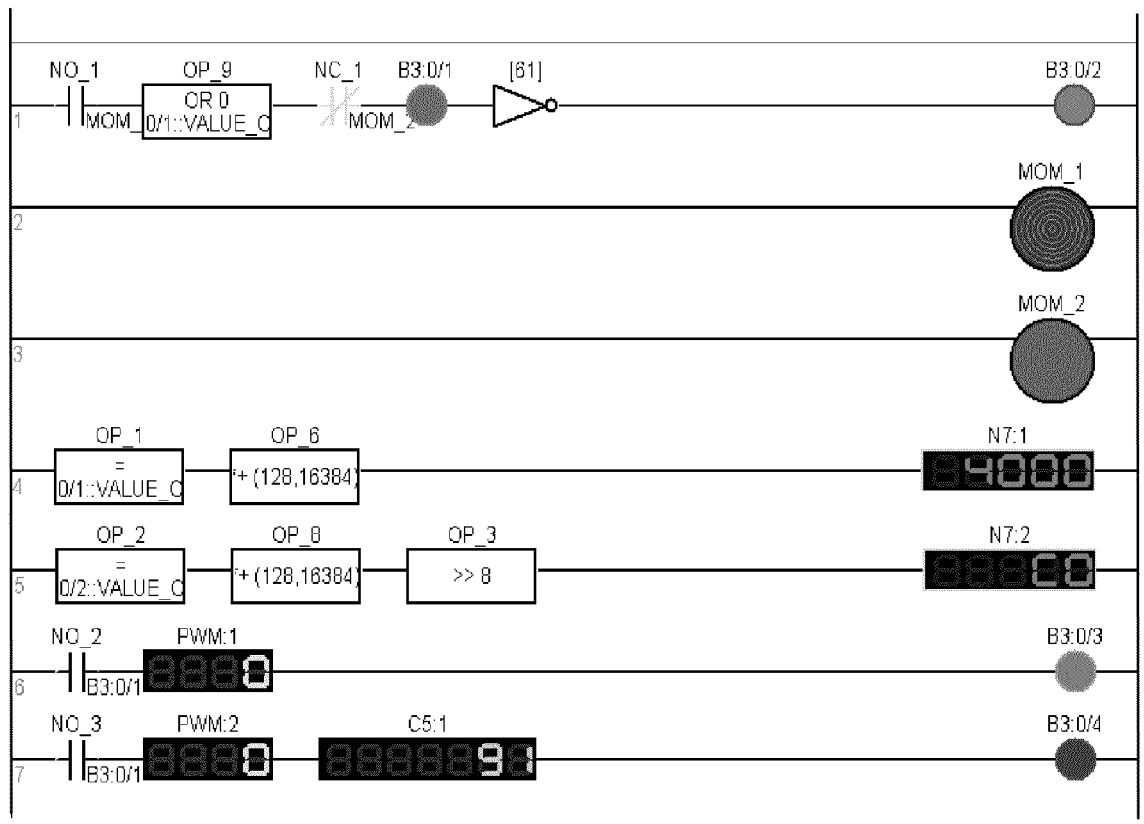
FIG. 12 illustrates an exemplary portion of control logic associated with at least one device incorporated within a human machine interface (HMI).

FIG. 11 illustrates an exemplary human machine interface (HMI) 1100 with device(s) having customized functionality. The HMI 1100 can include a plurality of devices with user-defined functionality such as a start button device 1102, a fan indicator device 1106, and a stop button device 1104. The start button device 1102 can be specifically programmed to light up upon being depressed and to activate the fan indicator device 1106 until the stop button device 1104 is depressed (e.g., allowing the stop button device 1104 to light up upon being depressed). Quickly turning to FIG. 12, an exemplary portion of control logic 1200 associated with at least one device incorporated within a human machine interface (HMI) is depicted.

Figure 13:
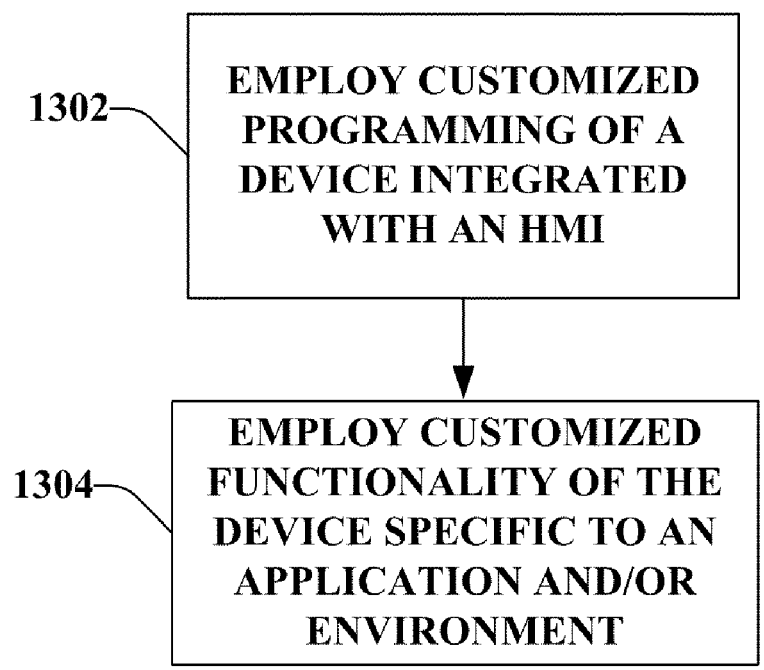
FIG. 13 illustrates an exemplary methodology for providing custom functionality for at least one device associated with a human machine interface (HMI).
Figure 14:
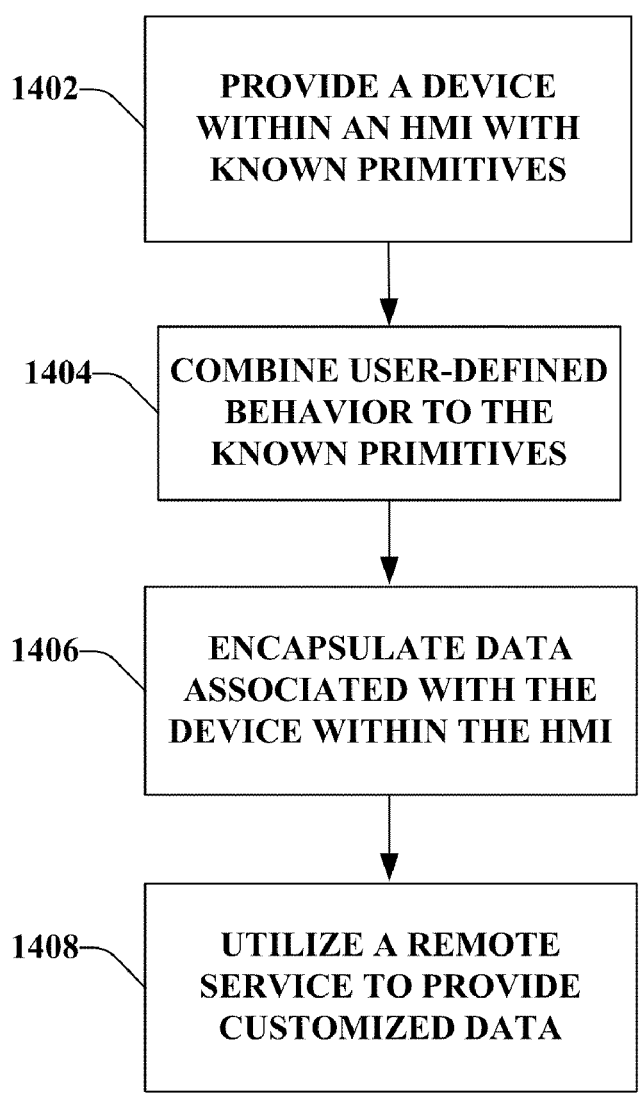
FIG. 14 illustrates an exemplary methodology that facilitates integrating user-defined functionality in a device within a human machine interface (HMI).

Referring to FIGS. 13-14, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 13 illustrates a methodology 1300 for providing custom functionality for at least one device associated with a human machine interface (HMI). At reference numeral 1302, a customized programming of a device integrated with a human machine interface (HMI) can be employed. For instance, the device within the HMI can be, but is not limited to, a light emitting diode (LED), a dial, an analog control, a bar graph, a graph, a push button, a gauge, a visual indicator, a slider, a light indicator, a numeric read out, a read out, a numeric input, an input, a graphical icon, any suitable device associated with an HMI that can provide user interaction, and any suitable device associated with an HMI that can provide data. The device can include pre-programmed primitives, wherein a user can further defined the functionality and/or behavior of such device 104 with custom programming of, for instance, control logic (e.g., Logix, ladder logic, etc.). Moreover, it is to be appreciated that there can be compound devices within the HMI, wherein a compound device is two or more devices with customized programming.

In one particular example, an HMI can include a bar graph device with known primitives (e.g., core and/or base functionality) that can be appended to allow a user and/or entity to program customized behavior to the bar graph device such as, but not limited to, colors, output, variables, scaling, when to turn off, when to turn on, etc. Moreover, the bar graph device can be encapsulated within the HMI such that any programming data associated thereto is within the same program-space.

At reference numeral 1304, a customized functionality of the device can be employed specific to an application and/or an environment. By appending the already programmed primitive functionality (e.g., out-of-box core functionality that is generic to the specific device) with user-defined customization, the devices can seamlessly integrate with any suitable application, automated industrial control environment, component, device, physical device, etc. It is to be appreciated that the logic is not just an extension to the primitive but allows the behavior to be defined in terms of interactions between primitives. The primitives can have very simple and limited customization (e.g., based on being primitives). The custom HMI device can be produced by the user combining HMI and logic primitives together to produce custom behavior and complex interfaces. Thus, the claimed subject matter includes adding custom behavior to a primitive and/or defining custom behavior between at least two primitives in order to create a custom HMI device. It is to be appreciated that the programming of the device can be implemented by utilizing a substantially similar programming paradigm associated with an application, a control system, an automated industrial control environment, etc. Moreover, the internal logic (e.g., customized behavior) of the device can be hidden from the designer (e.g., encapsulated within the HMI programming space).

FIG. 14 illustrates a methodology 1400 that facilitates integrating user-defined functionality in a device within a human machine interface (HMI). At reference numeral 1402, a device within a human machine interface (HMI) with known primitives (e.g., out-of-box core functionality that is generic to the specific device) can be provided. For instance, the known primitive and/or pre-programmed functionality can be generic behavior for a push button device (e.g., on and off functionality). At reference numeral 1404, a user-defined behavior can be appended to the known primitives. A user-specific customized functionality can be appended to the data associated with the known primitives to allow seamless integration with at least one of an automated industrial environment, an application, a disparate device, a disparate HMI, the HMI, etc.

At reference numeral 1406, the data associated with the device can be encapsulated within the HMI. Thus, the appended data and respective known primitives related to the devices can be within the substantially same machine space and/or programming space as the HMI. By encapsulating such data in the HMI, errors, changes, manipulations, corrections can be maintained in one location rather than throughout code associated with the device and any place the device is utilized. At reference numeral 1408, a remote service can be utilized to provide customized data to the device within the HMI. It is to be appreciated that any remote service can be utilized in connection with providing customized functionality of the device, primitive functionality of the device, and/or any other suitable data and/or assistance related to the device. For example, a third-party service can provide services that can be subscribed thereto that allow a community of users to share customized functionality (e.g., data) associated with devices (e.g., implemented in user's respective environments). In another example, a manufacture of the HMI with the incorporated device can utilize knowledge of the various consumers of such devices who potentially created/generated user-defined functionality. Thus, the manufacture can provide remote services that allow the upload of various customized functionalities associated with device(s). In still another example, a request can be made from a user to the remote service with specific details on a desired custom functionality for a particular device, wherein the remote service can fulfill such request by providing the user-defined customization of the behavior for the device (e.g., contracting-out the programming).

Figure 15:
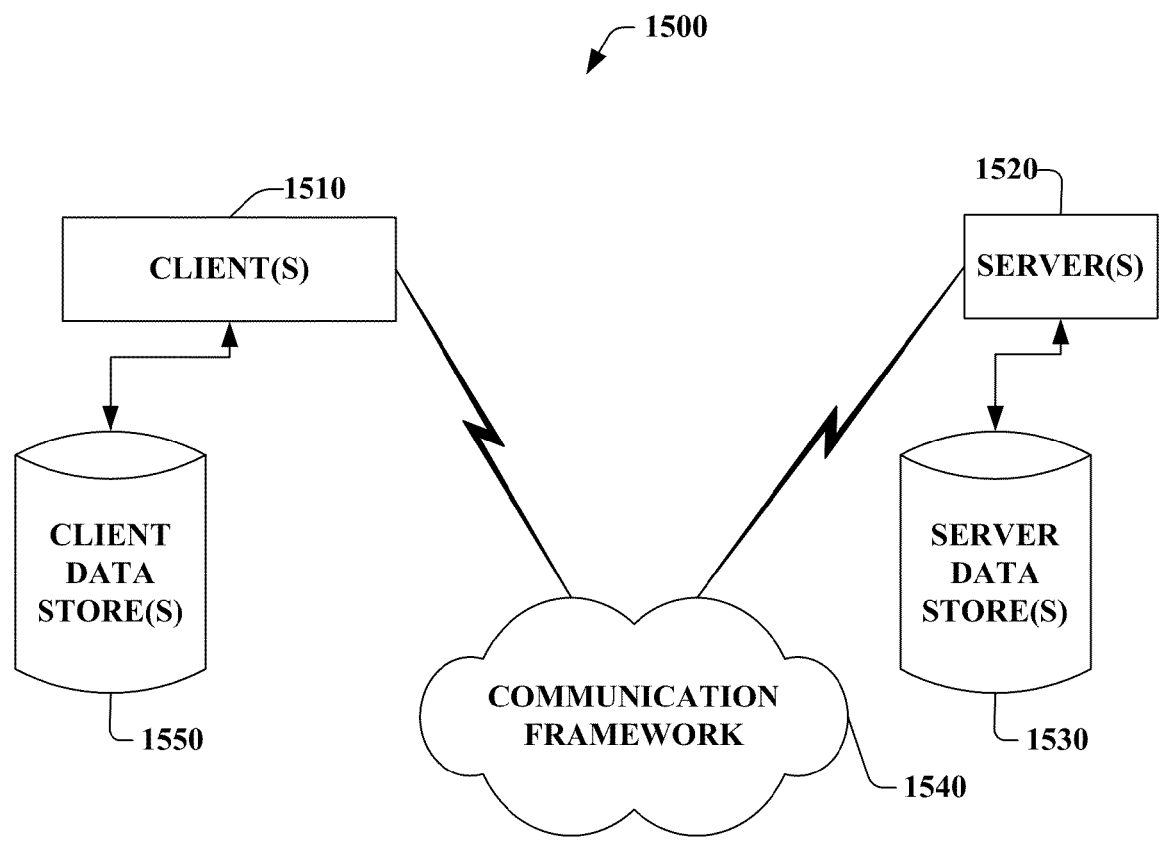
FIG. 15 illustrates an exemplary networking environment, wherein the novel aspects of the claimed subject matter can be employed.
Figure 16:
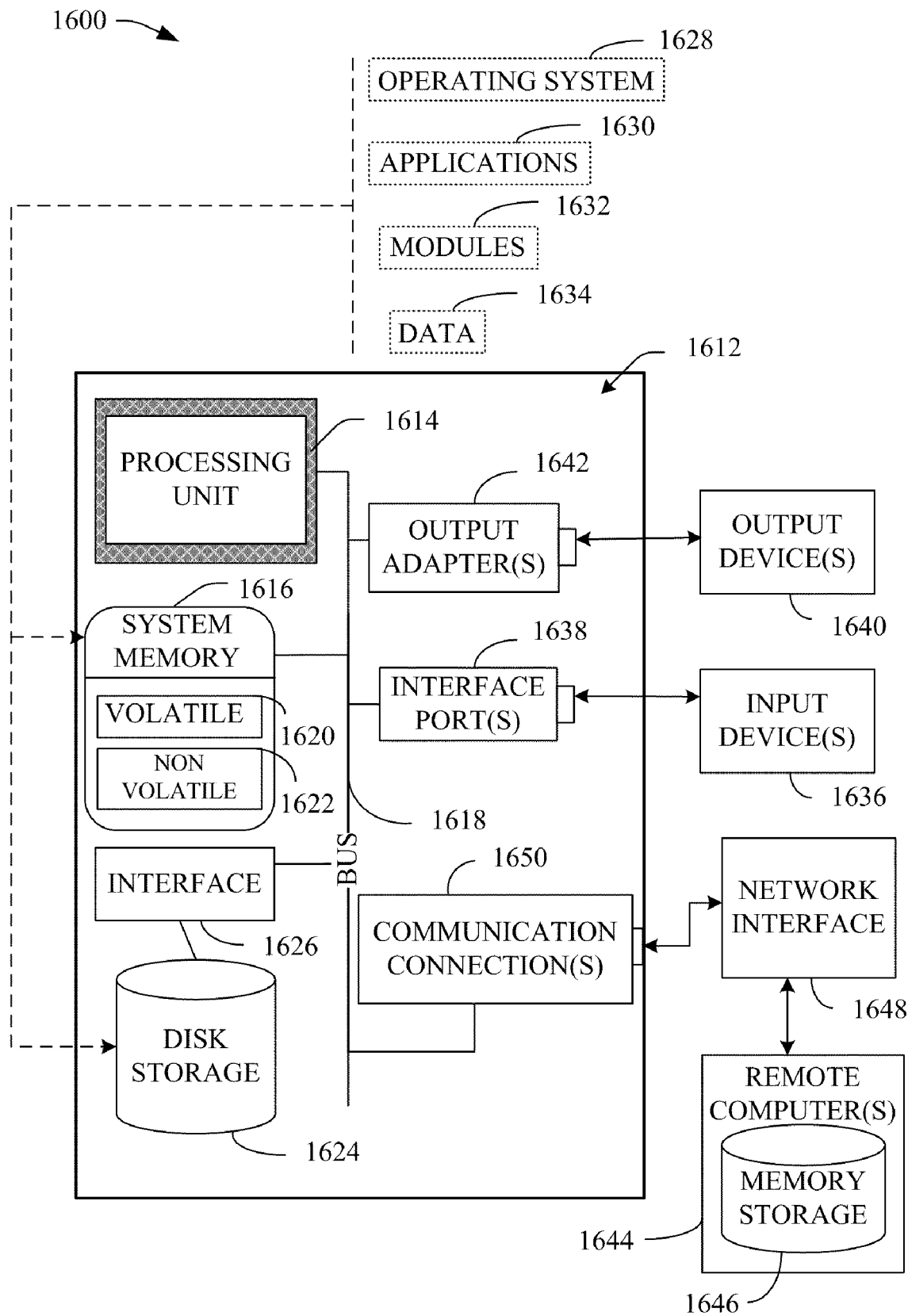
FIG. 16 illustrates an exemplary operating environment that can be employed in accordance with the claimed subject matter.

In order to provide additional context for implementing various aspects of the claimed subject matter, FIGS. 15-16 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 15 is a schematic block diagram of a sample-computing environment 1500 with which the claimed subject matter can interact. The system 1500 includes one or more client(s) 1510. The client(s) 1510 can be hardware and/or software (e.g., threads, processes, computing devices). The system 1500 also includes one or more server(s) 1520. The server(s) 1520 can be hardware and/or software (e.g., threads, processes, computing devices). The servers 1520 can house threads to perform transformations by employing the subject innovation, for example.

One possible communication between a client 1510 and a server 1520 can be in the form of a data packet adapted to be transmitted between two or more computer processes. The system 1500 includes a communication framework 1540 that can be employed to facilitate communications between the client(s) 1510 and the server(s) 1520. The client(s) 1510 are operably connected to one or more client data store(s) 1550 that can be employed to store information local to the client(s) 1510. Similarly, the server(s) 1520 are operably connected to one or more server data store(s) 1530 that can be employed to store information local to the servers 1520.

With reference to FIG. 16, an exemplary environment 1600 for implementing various aspects of the claimed subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable programmable ROM (EEPROM), or flash memory. Volatile memory 1620 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in the suitable operating environment 1600. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the claimed subject matter can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A human machine interface (HMI) configured to interface with an industrial control system, the HMI comprising:
   a memory that stores a representation of a HMI device comprising a default functionality defined by a first portion of control logic of a same programming paradigm as control logic of the industrial control system;
   an interface component that receives a second portion of control logic that defines a custom functionality of the HMI device, wherein the second portion of control logic is of the same programming paradigm as the control logic of the industrial control system; and
   a processor that appends the second portion of control logic to the first portion of control logic to add the custom functionality to the HMI device.

2. The HMI of claim 1, wherein the HMI device is a light emitting diode (LED), a dial, an analog control, a bar graph, a graph, a push button, a gauge, a visual indicator, a slider, a light indicator, a numeric read out, a read out, a numeric input, an input, or a graphical icon.

3. The HMI of claim 1, wherein the first portion of control logic or the second portion of control logic comprises ladder logic.

4. The HMI of claim 1, wherein the memory stores a third portion of control logic associated with a second HMI device.

5. The HMI of claim 4, wherein the interface component receives a fourth portion of control logic that creates a compound device comprising the HMI device and the second HMI device working together.

6. The HMI of claim 1, wherein the interface component receives the second portion of control logic from a remote service.

7. The HMI of claim 1, wherein the first portion of control logic and the second portion of control logic are encapsulated within the HMI.

8. A device, comprising:
   an industrial controller capable of storing application programs comprising control logic; and
   a human machine interface (HMI) communicatively coupled to the industrial controller, comprising:
      a memory that stores a first portion of control logic, of a same programming paradigm as the control logic of the industrial controller, that provides a default functionality of a representation of an HMI device;
      an interface component that receives a second portion of control logic, of the same programming paradigm as the control logic of the industrial controller, that provides a custom functionality of the HMI device; and
      a processor that appends the second portion of control logic to the first portion of control logic to add the custom functionality to the HMI device.

9. The device of claim 8, wherein the HMI device is a light emitting diode (LED), a dial, an analog control, a bar graph, a graph, a push button, a gauge, a visual indicator, a slider, a light indicator, a numeric read out, a read out, a numeric input, an input, or a graphical icon.

10. The device of claim 8, wherein the control logic comprises ladder logic.

11. The device of claim 8, wherein the memory stores a third portion of control logic associated with a second HMI device.

12. The device of claim 11, wherein the interface component is configured to receive a third portion of control logic that creates a compound device comprising the HMI device and the second HMI device.

13. The device of claim 8, wherein the interface component is configured to receive the second portion of control logic from a remote service.

14. The device of claim 8, wherein the second portion of control logic and the first portion of control logic are encapsulated within the HMI.

15. A method for customizing a human machine interface (HMI) within an industrial control system, comprising:
- storing a first portion of control logic that provides a default functionality to a representation of an HMI device in memory, wherein the first portion of control logic is of a same programming paradigm as control logic of the industrial control system;
- receiving a second portion of control logic, of the same programming paradigm as the control logic of the industrial control system, that provides a custom functionality to the HMI device; and
- employing a processor that appends the second portion of control logic to the first portion of control logic to add the custom functionality to the HMI device.

16. The method of claim 15, wherein the HMI device is a light emitting diode (LED), a dial, an analog control, a bar graph, a graph, a push button, a gauge, a visual indicator, a slider, a light indicator, a numeric read out, a read out, a numeric input, an input, or a graphical icon.

17. The method of claim 15, wherein the second portion of control logic comprises ladder logic.

18. The method of claim 15, wherein the receiving the second portion of control logic further comprises receiving the second portion of control logic from a remote service.

19. The method of claim 15, further comprising encapsulating the first portion of control logic and the second portion of control logic within the HMI.

20. The method of claim 15, further comprising:
- storing a third portion of control logic associated with a second HMI device in memory;
- receiving a fourth portion of control logic that creates a compound device comprising the HMI device and the second HMI device; and
- employing the processor to append the fourth portion of control logic to the third portion of control logic, the first portion of control logic and the third portion of control logic to create the compound device comprising the first HMI device and the second HMI device.

* * * * *